(12) United States Patent
Jafri et al.

(10) Patent No.: US 10,409,738 B2
(45) Date of Patent: Sep. 10, 2019

(54) INFORMATION SWITCHING

(71) Applicant: ARM LIMITED, Cambridge (GB)

(72) Inventors: Syed Ali Raza Jafri, Sheffield (GB); Stephan Diestelhorst, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/742,164

(22) PCT Filed: Aug. 23, 2016

(86) PCT No.: PCT/GB2016/052616
§ 371 (c)(1),
(2) Date: Jan. 5, 2018

(87) PCT Pub. No.: WO2017/033000
PCT Pub. Date: Mar. 2, 2017

(65) Prior Publication Data
US 2018/0210845 A1    Jul. 26, 2018

(30) Foreign Application Priority Data

Aug. 24, 2015   (GB) .................................. 1515016.2

(51) Int. Cl.
| | |
|---|---|
| *G06F 13/00* | (2006.01) |
| *G06F 13/16* | (2006.01) |
| *H04L 12/40* | (2006.01) |
| *H04L 12/801* | (2013.01) |
| *H04L 12/937* | (2013.01) |
| *H04L 12/935* | (2013.01) |
| *G06F 13/40* | (2006.01) |
| *H04L 12/933* | (2013.01) |

(52) U.S. Cl.
CPC ...... *G06F 13/1642* (2013.01); *H04L 12/4015* (2013.01); *H04L 47/15* (2013.01);
(Continued)

(58) Field of Classification Search
CPC . H04L 49/3072; H04L 47/15; H04L 12/4015; H04L 49/254; H04L 49/101;
(Continued)

(56) References Cited

U.S. PATENT DOCUMENTS 7,133,399 B1 * 11/2006 Brewer .................. H04L 45/00
370/360
7,254,141 B1    8/2007 Desai et al.
(Continued)

FOREIGN PATENT DOCUMENTS

EP         0 576 240         12/1993

OTHER PUBLICATIONS

International Search Report and Written Opinion of the ISA for PCT/GB2016/052616, dated Nov. 25, 2016, 13 pages.
(Continued)

*Primary Examiner* — Jing-Yih Shyu
(74) *Attorney, Agent, or Firm* — Nixon & Vanderhye P.C.

(57) ABSTRACT

An information switch comprises a plurality of input circuits and a plurality of output circuits, the information switch being configured to communicate information units between the input circuits and the output circuits in successive transmission cycles; each input circuit being configured, in dependence upon a queue of one or more information units for transmission via that input circuit and in dependence upon hint data received in respect of a current transmission cycle, to send an information unit transmission request to one or more of the output circuits; and each output circuit being configured, in response to one or more information unit transmission requests received from respective input circuits, to select an input circuit for information unit transmission to that output circuit in a current transmission cycle and to provide hint data indicating a provisional selection, by that output circuit, of an input circuit at a next transmission cycle.

13 Claims, 7 Drawing Sheets

(52) U.S. Cl.
CPC ........ *H04L 49/254* (2013.01); *H04L 49/3072* (2013.01); *G06F 13/4031* (2013.01); *H04L 49/101* (2013.01); *H04L 49/3045* (2013.01)

(58) Field of Classification Search
CPC ............. H04L 49/3045; G06F 13/1642; G06F 13/4031
See application file for complete search history.

(56) References Cited

U.S. PATENT DOCUMENTS

| | | |
|---|---|---|
| 8,266,382 B1 | 9/2012 | Minkin et al. |
| 2003/0156597 A1* | 8/2003 | Eberle ............... H04L 12/40019 370/447 |
| 2009/0157977 A1* | 6/2009 | Gregg ................. G06F 12/0806 711/141 |
| 2014/0269751 A1* | 9/2014 | Koka .................. H04L 47/6205 370/413 |

OTHER PUBLICATIONS

Combined Search and Examination Report for GB 1515016.2, dated Feb. 10, 2016, 5 pages.
Mullins et al. "Low-Latency Virtual-Channel Routers for On-Chip Networks", 2013 21st International Conference On Program Comprehension (ICPC), Jan. 1, 2004, 10 pages.
McKeown "The iSLIP Scheduling Algorithm for Input-Queued Switches", IEEE/ACM Transactions On Networking, vol. 7, No. 2, Apr. 1, 1999, 14 pages.

* cited by examiner

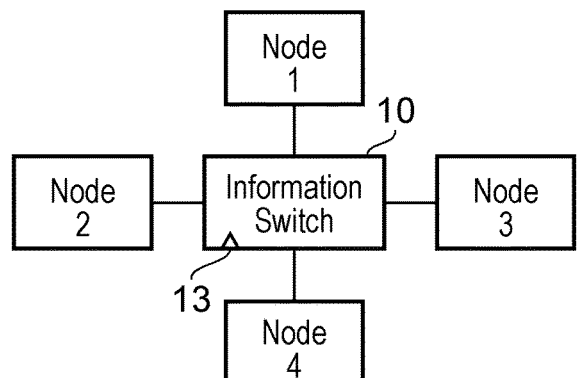
FIG. 1
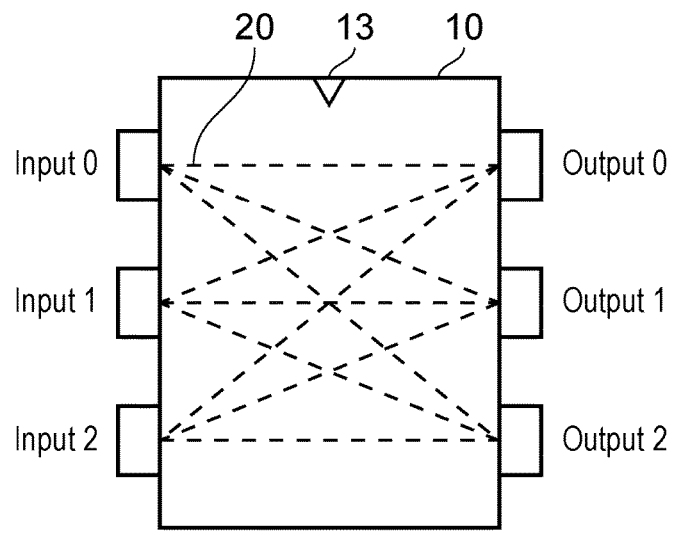
FIG. 2
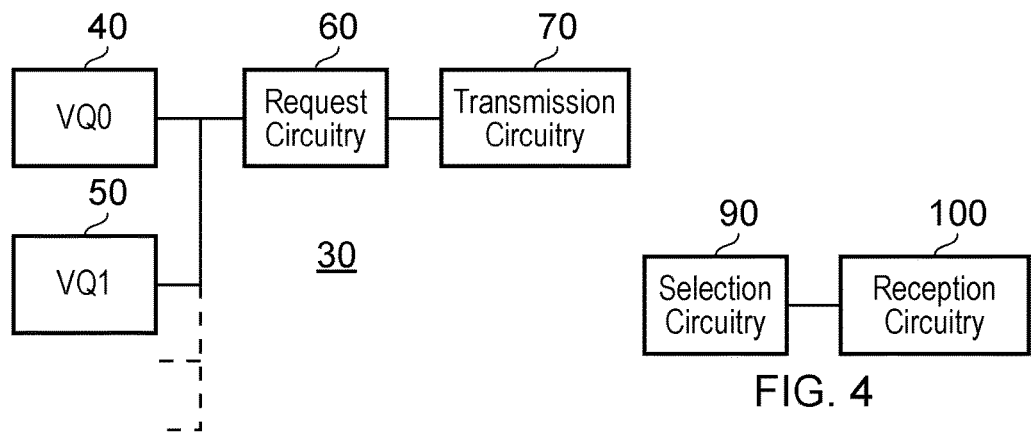
FIG. 3
FIG. 4

INFORMATION SWITCHING

This application is the U.S. national phase of International Application No. PCT/GB2016/052616 filed Aug. 23, 2016, which designated the U.S. and claims priority to GB Patent Application No. 1515016.2 filed Aug. 24, 2015, the entire contents of each of which are hereby incorporated by reference.

BACKGROUND

This disclosure relates to information switching.

Information switching arrangements can route or switch information units (such as packets or other subdivisions such as so-called flits) between multiple inputs and multiple outputs. In such arrangements, arbitration can be needed between information units competing for transmission by the same input or to the same output.

Various approaches have been used for switch arbitration. A general aim is to create or recognise matches for information transmission between inputs and outputs with a view to increasing the number of such matches while still following certain constraints. An example of such a constraint is a limit that one input can perform information transmission to just one output in any individual transmission cycle. There can also be timing constraints for carrying out the arbitration process and making such decisions, and generally speaking a faster switching device will provide less time for carrying out the arbitration process.

Some arrangements rely on input ports or circuits sending multiple requests for information transmission to various output ports or circuits, and receiving one or more grants of access back as a result. Such arrangements can suffer from a loss of efficiency because some of these grants may not be accepted by input circuits which can each only accept one grant at a time.

It is a general aim to improve the efficiency of information switching, for example by improving an arbitration process.

SUMMARY

In an example arrangement there is provided an information switch comprising:

a plurality of input circuits and a plurality of output circuits, the information switch being configured to communicate information units between the input circuits and the output circuits in successive transmission cycles;

each input circuit being configured, in dependence upon a queue of one or more information units for transmission via that input circuit and in dependence upon hint data received in respect of a current transmission cycle, to send an information unit transmission request to one or more of the output circuits; and each output circuit being configured, in response to one or more information unit transmission requests received from respective input circuits, to select an input circuit for information unit transmission to that output circuit in a current transmission cycle and to provide hint data indicating a provisional selection, by that output circuit, of an input circuit at a next transmission cycle.

In another example arrangement there is provided an information switch comprising:

a plurality of input means and a plurality of output means, the information switch being configured to communicate information units between the input means and the output means in successive transmission cycles;

each input means being operable, in dependence upon a queue of one or more information units for transmission via that input circuit and in dependence upon hint data received in respect of a current transmission cycle, to send an information unit transmission request to one or more of the output circuits; and each output means being operable, in response to one or more information unit transmission requests received from respective input means, to select an input means for information unit transmission to that output means in a current transmission cycle and to provide hint data indicating a provisional selection, by that output means, of an input means at a next transmission cycle.

In another example arrangement there is provided an information switching method comprising:

communicating information units between a plurality of input circuits and a plurality of output circuits in successive transmission cycles;

each input circuit sending an information unit transmission request to one or more of the output circuits in dependence upon a queue of one or more information units for transmission via that input circuit and in dependence upon hint data received in respect of a current transmission cycle; and each output circuit selecting an input circuit for information unit transmission to that output circuit in a current transmission cycle and providing hint data indicating a provisional selection, by that output circuit, of an input circuit at a next transmission cycle, in response to one or more information unit transmission requests received from respective input circuits.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 1 schematically illustrates a data processing apparatus;

FIG. 2 schematically illustrates an information switch;

FIGS. 3 and 4 respectively provide schematic representations of an input circuit and an output circuit of an information switch;

DESCRIPTION OF EMBODIMENTS

Figure 5A:
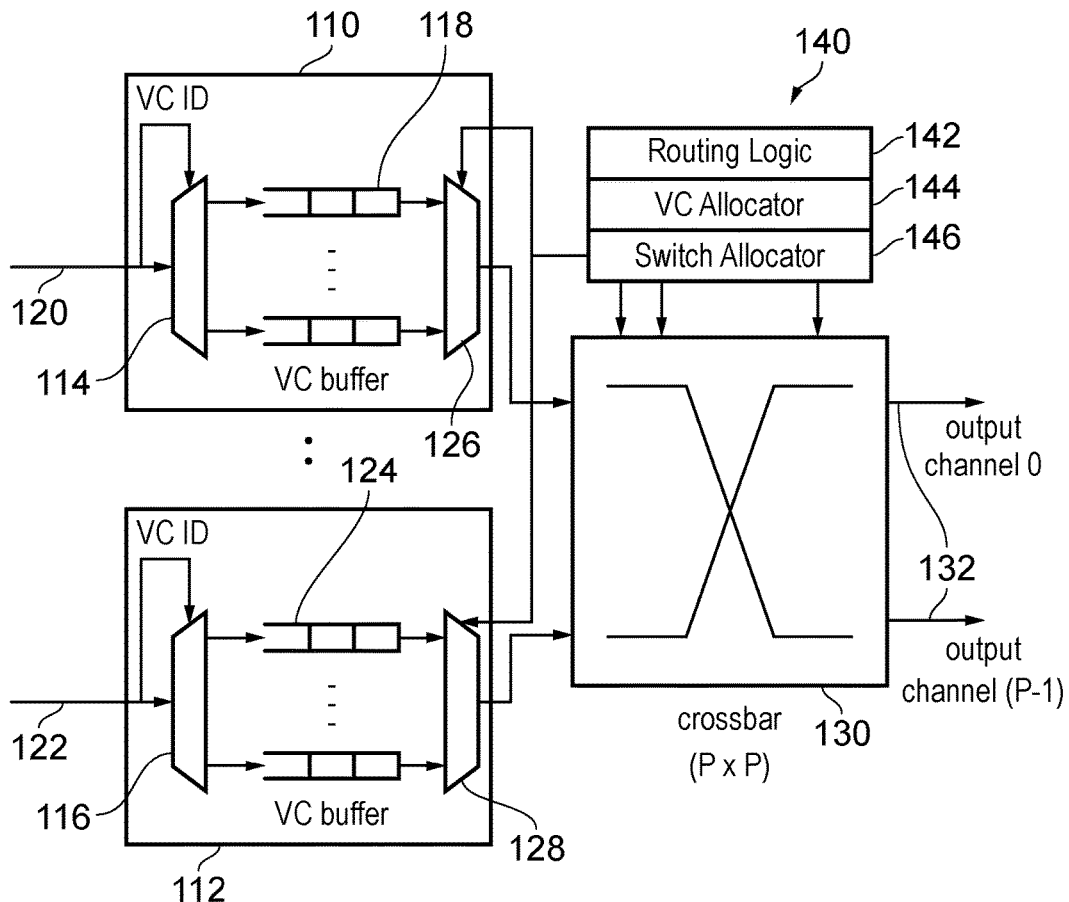
FIG. 5A provides another schematic representation of an information switch.

Before discussing the embodiments with reference to the accompanying figures, the following description of embodiments is provided.

An example embodiment provides an information switch comprising:

a plurality of input circuits and a plurality of output circuits, the information switch being configured to communicate information units between the input circuits and the output circuits in successive transmission cycles;

each input circuit being configured, in dependence upon a queue of one or more information units for transmission via that input circuit and in dependence upon hint data received in respect of a current transmission cycle, to send an information unit transmission request to one or more of the output circuits; and each output circuit being configured, in response to one or more information unit transmission requests received from respective input circuits, to select an input circuit for information unit transmission to that output circuit in a current transmission cycle and to provide hint data indicating a provisional selection, by that output circuit, of an input circuit at a next transmission cycle.

The present techniques aim to reduce wasted bandwidth as a result of unaccepted grants from the output circuits in an arbitration technique for an information switching arrangement. It is noted that unaccepted grants can arise because of an input circuit sending out multiple transmission requests. However, sending multiple requests is also a contribution to performance; if the input circuit always sent just one request and the output circuit granted another input circuit's request, the arbitration arrangement would exhibit poorer performance. In examples of the present techniques, the information available to the output circuit can be used to provide a provisional indication of acceptance to another input circuit for the next round of arbitration, so that at a next transmission cycle the information unit transmission request or requests provided by an input circuit can be more closely targeted, for example towards the output circuit which provided the hint data.

In examples, each input circuit is configured to transmit an information unit, in a current transmission cycle, to an output circuit which selected that input circuit for information unit transmission. As a further example of this arrangement, in examples, each input circuit is configured, when hint data has been provided indicating a provisional selection of that input circuit by one output circuit, to request information unit transmission only to the output circuit which provided the hint data. This can reduce a potential wastage of bandwidth caused by unaccepted requests by an input circuit sending a request only to an output circuit which has already provided provisional acceptance.

In the case that hint data has been provided indicating a provisional selection of that input circuit by two or more output circuits, in example embodiments an input circuit is configured to select one of those output circuits according to a hint selection algorithm and to request information unit transmission only to the selected output circuit. For example, the hint selection algorithm may be a round robin algorithm, and/or may be dependent upon transmission priority information associated with information units in the associated queues.

In example embodiments, each input circuit has two or more associated queues; and each input circuit is configured, in the absence of hint data indicating a provisional selection of that input circuit, to request information unit transmission to those output circuits which are destinations of information units at the head of at least one of the queues associated with that input circuit.

In example embodiments, each output circuit may be configured to select an input circuit for information unit transmission in respect of a current transmission cycle from amongst those input circuits requesting information unit transmission, according to a circuit selection algorithm, which may be, for example a round robin algorithm. In examples, in order that the hint data represents the expected outcome of an arbitration process carried out at the next transmission cycle, each output circuit may be configured to generate the hint data according to the circuit selection algorithm as applied to those input circuits requesting information unit transmission. In example embodiments a currently selected (granted) input circuit may be excluded from the hint data generation process, for example by each output circuit being configured to generate the hint data according to the circuit selection algorithm as applied to one or more input circuits request information unit transmission other than an input circuit selected in respect of the current transmission cycle.

In example embodiments, the receipt of plural requests initiates the generation of hint data by an output circuit, in that each output circuit may be configured to provide hint data in response to that output circuit receiving information unit transmission requests from more than one input circuit.

In an elegantly straightforward example arrangement, when two input circuits request information unit transmission to an output circuit, that output circuit is configured to select one of the two input circuits for information unit transmission in a current transmission cycle and to provide hint data in respect of the other one of the two input circuits. An alternative elegantly straightforward example is one in which each output circuit is configured to provisionally select an input circuit for information unit transmission in respect of a next transmission cycle from amongst those input circuits requesting information unit transmission, according to a random or pseudo-random selection. In both of these examples, execution a full arbitration process can be avoided. In either case, in such instances, in order to be able to act on the hint data at the next transmission cycle, in examples each output circuit comprises data storage configured to store the provisional selection of an input circuit in respect of a next transmission cycle.

In embodiments, each output circuit is configured to communicate hint data provided by that output circuit to the one or more input circuits having a provisional selection indicated by that hint data, for example just to the relevant input circuits or as a broadcast to all input circuits (so that, for example, non-hinted input circuits can avoid sending a request to that output circuit).

Another example embodiment provides an information switch comprising:

a plurality of input means and a plurality of output means, the information switch being configured to communicate information units between the input means and the output means in successive transmission cycles;

each input means being operable, in dependence upon a queue of one or more information units for transmission via that input circuit and in dependence upon hint data received in respect of a current transmission cycle, to send an information unit transmission request to one or more of the output circuits; and each output means being operable, in response to one or more information unit transmission requests received from respective input means, to select an input means for information unit transmission to that output means in a current transmission cycle and to provide hint data indicating a provisional selection, by that output means, of an input means at a next transmission cycle.

The present arrangements may be embodied as an information network comprising: a plurality of information handling nodes; and an information switch as defined above, the information switch being configured to carry information between the information handling nodes. The present arrangements are particularly suitable for use in a network-on-chip device comprising an integrated circuit substrate on which is fabricated an information network as defined above.

Another example embodiment provides an information switching method comprising:

communicating information units between a plurality of input circuits and a plurality of output circuits in successive transmission cycles;

each input circuit sending an information unit transmission request to one or more of the output circuits in dependence upon a queue of one or more information units for transmission via that input circuit and in dependence upon hint data received in respect of a current transmission cycle; and each output circuit selecting an input circuit for information unit transmission to that output circuit in a current transmission cycle and providing hint data indicating a provisional selection, by that output circuit, of an input circuit at a next transmission cycle, in response to one or more information unit transmission requests received from respective input circuits.

Referring now to the drawings, FIG. 1 schematically illustrates a data processing apparatus comprising: a plurality of data handling nodes (labelled as node 1 . . . node 4 in FIG. 1) and an information switch 10 connected to the plurality of data handling nodes.

The data handling nodes can be various types of node, such as, for example, a processing element such as a CPU (central processing unit) or CPU cluster, possibly with an associated cache memory, peripheral components such as input/output components, a memory, direct memory access (DMA) devices and so on. In examples, one or more data handling nodes can be other information switches, so that information is passed from one switch to another in a network of switches and other components.

The information switch of FIG. 1 can operate according to a signal 13 such as a clock signal (or a signal derived from a clock signal, for example by a division by a predetermined factor) indicative of successive transmission cycles.

The information switch 10 serves to route information (data or control signals) between the nodes. Information passing from a node to the information switch 10 is received or handled by an input port or circuit of the information switch 10. Information passing from the information switch 10 to a node is handled or transmitted by an output port or circuit of the information switch 10. Each node can be connected to zero or more input circuits of the information switch 10 and to zero or more output circuits of the information switch 10. In other words, a node could just be an information source, or just an information sink or receiver, or both.

FIG. 1 therefore provides an example of an information network comprising:

a plurality of information handling nodes (such as the nodes 1 . . . 4); and an information switch (such as the information switch 10) configured to carry information between the information handling nodes.

The data processing apparatus of FIG. 1 may be implemented as a single integrated circuit, such as a so-called system on a chip (SoC) or a so-called network on a chip (NoC). Alternatively, the data processing apparatus of FIG. 1 may be implemented as multiple discrete and interconnected systems or components. This provides an example of a network-on-chip device comprising an integrated circuit substrate on which is fabricated an information network as described above.

FIG. 2 schematically illustrates the information switch 10 in slightly more detail, showing a set of inputs (in this example for clarity of the diagram, three inputs labelled as input 0 . . . 2 are shown, but other examples may use different numbers of inputs) and three outputs labelled as output 0 . . . 2. Again, note that in other example embodiments different numbers of outputs may be used, and there is no requirement that the number of outputs is the same as the number of inputs. Subject to any design restrictions on data flow, information can be passed from any input to any output, and the various possible paths are indicated in FIG. 2 by dashed lines 20.

Each of the inputs is implemented as a respective input port or circuit. Each of the outputs is implemented as a respective output port or circuit.

Each input port or circuit has one or more associated logical input queues. More than one queue can apply to an individual input port, for example using virtual queues. A virtual queue may be a queue maintained in storage such as random access memory such that an individual input circuit can maintain multiple instances of virtual queues, even though at each transmission cycle only one flit or other information unit can be transmitted. For example, there may be a virtual queue for data and another virtual queue for control information.

An example of a virtual queue is provided by a virtual channel (discussed in more detail below) by which data in any virtual channel can go to any output port. Another example is provided by a virtual output queue, by which data in a particular virtual output queue can only go to designated output port or set of output ports.

Each input queue may, in example embodiments, hold flow control digits (flits) which represent portions of information packets having a destination as one of the output ports. Information can be provided from transmitting nodes in the form of flits, and reassembled by receiving nodes from received flits. Or an input circuit can provide logic or circuitry to divide incoming packets into flits, for example such that the flits have a predetermined size or a predetermined maximum size, which implies that the number of flits into which an incoming packet is divided can depend upon the size of the incoming packet. Each flit may have associated data (such as header data or the like) indicating (a) an identity of its originating packet, (b) an order or position within that originating packet, (c) a destination node or output circuit, and (d) optionally, a priority. Note that in the case of (b), in examples, it may be that only three indications of position may be required: an indication that this is the first flit of a packet (though this might be implied by a first occurrence of a packet identifier); an indication that a subsequent flit is not a last flit of that packet, and an indication that a subsequent flit is a last flit of that packet. The relative ordering, within the packet, of the flits between the first and last flit can be implied by the order of transmission of the flits, which in turn can be assured by placing all of the flits relating to an individual packet into a single queue in order of occurrence within that packet.

A flit represents a smallest unit of information transmission via the information switch. A data or control packet may be transmitted from an input port to an output port over several cycles (not necessarily consecutive cycles) as a set of two or more flits. In example embodiments, a constraint applies to the passing of information from an input to an output, which constraint is that only one input may send a flit to any particular output in a single transmission cycle. That is to say, in a single transmission cycle, an output port cannot simultaneously receive information from multiple input ports.

In other examples, a switch could be arranged so as to move more than one flit in each transmission cycle, but with (for example) the total number of flits that can be moved during a cycle being limited to a predetermined quantity. Although embodiments are described relating to one flit per cycle, the principles discussed here are applicable to systems allowing more than one flit per cycle.

However, the queues associated with the input ports may contain flits having the same destination, which is to say that at any one time there may be queues associates with two or more of the input ports which have (at the head of the queues) flits having a destination of the same output port. There is therefore a need for arbitration to decide which of the flits should be transmitted to a contested output port at any one transmission cycle. A switch arbiter arrangement can be used to make these decisions. The way in which the switch arbiter allocates the transmission of information to the output ports can have a significant effect upon the efficiency or throughput of the information switch. A poor arbitration arrangement can lead to blocking of some output ports and a loss of opportunity for information transmission via one or more of the input and output ports which in turn can produce a loss of performance. But given the short transmission cycle durations in many on-chip and off-chip networks, switch arbiters cannot necessarily run sophisticated matching and allocation algorithms to address this issue.

Various other matching or arbitration techniques have been previously proposed such as the so-called Wavefront Algorithm (WFA), the Dual Round Robin Matching (DRRM) algorithm, the Simple Pipelined Arbitration Algorithm (SPAA) and an iterative switch arbitration algorithm known as iSLIP.

In contrast to all of these algorithms, example embodiments of the present disclosure can provide techniques for operating an information switch and arbitrating between contesting information unit transmissions. Example embodiments of the present techniques can provide an output which is no worse than the single iteration iSLIP technique and in many instances a more efficient arbitration and routing arrangement is potentially provided.

In a single iteration iSLIP system, each input port sends requests to all output ports for which the input port has a packet. Because of input queuing/virtual channels, each input port may simultaneously have packets for multiple output ports. Then, each output port nominates a single input port based on a private round robin counter. Finally, each input port chooses one out of all responding output ports based on a private round robin counter. The matched input and output ports then increment their respective private counters.

An issue which can arise with the iSLIP algorithm is that multiple output ports or circuits can issue grants to the same input port or circuit. Since the input port can accept only one grant, this can lead to a waste of bandwidth because some grants are not used. In a basic iSLIP implementation, multiple iterations can be used to reduce this wastage, but in many instances there simply is not enough time in a transmission cycle to carry out such multiple iterations.

The present techniques aim to reduce wasted bandwidth as a result of unaccepted grants from the output ports. It is noted that unaccepted grants arise because of an input port sending out multiple requests. However, sending multiple requests is also a contribution to performance; if the input port sent just one request and the output port granted another input port's request, the arbitration arrangement would exhibit poorer performance.

In the present techniques, the information available to the output port is used to provide a provisional indication of acceptance to another input for the next round of arbitration. Consider an example where an output port receives requests from two input ports. The output port grants the first request, and sends an indication of provisional acceptance to the second requestor for the next round of arbitration. The second requesting input port may then only send out a single request to this output port in the next round of arbitration. This will reduce total number of requests being sent out without necessarily hurting performance. The reduced number of requests also helps to reduce or avoid rejected grants, which can also improve overall bandwidth.

The following are stages of an example implementation of the present techniques. Each input port checks to see if it has any hint data from any output ports. If yes, then in at least some examples the input port will send a request only to that output port; otherwise, the input port will send requests to all output ports for which it has information waiting to be sent. Each output port grants one request, and grants one indication of provisional acceptance (in respect of the next transmission cycle) if the output port received more than one request. Then, each input port chooses one out of all responding output ports.

FIGS. 3 and 4 respectively provide schematic representations of an input circuit and an output circuit of an information switch of the type being described. Referring to FIG. 3, the input circuit 30 has one or more input queues such as virtual queues 40, 50, request circuitry 60 which handles the sending of requests for data transmission to output circuits and the handling of responses received from the output circuits, and transmission circuitry 70 which handles the actual transmission of the information to a selected output port or circuit. Referring to FIG. 4, an output circuit comprises selection circuitry 90 which handles requests received from input circuits which request that a particular input circuit be granted permission to send information to the output circuit, and data reception circuitry 100 which handles the actual received data when it arrives.

Accordingly, the information switch 10 provides an example of an information switch comprising a plurality of input circuits and a plurality of output circuits, the information switch being configured to communicate information units (such as data or control packets or so-called flits, which will be described below) between the input circuits and the output circuits in successive transmission cycles such as clock cycles.

FIG. 5A provides another schematic representation of the information switch 10.

In FIG. 5A, two input circuits or input ports 110, 112 are shown. It will be appreciated that there may be more (or indeed fewer) but just two are shown for clarity of the diagram. Each input circuit receives input information on a respective input 120, 122. The input information has associated "virtual channel" (VC) identification information (VOID), such that different packets, flits or other units of information are associated with different virtual channels. More than one unit of information may be associated with the same virtual channel.

A virtual channel is used in an information routing system such as that shown in FIG. 1 (or a system comprising a network of multiple interconnected instances of the arrangement shown in FIG. 1) to provide an emulation of a physical channel between an information input and an information output. Information packets or other units launched into the system with a particular VOID are routed by the network of switching devices to the appropriate information output according to their VOID.

The VOID can therefore indicate a path across an individual switching device and also, where appropriate, a path from switching device to switching device in a network of devices. The VOID can therefore provide, to an input circuit of an individual switching device, an indication of a required output circuit or port at that device.

At an input circuit 110, 112 in FIG. 5A, the input information is separated or demultiplexed by a demultiplexer 114, 116 according to its VOID into respective ones of a set of virtual queues 118, 124, for example, one for each VOID. The queues are illustrated schematically in FIG. 5A as VC buffers.

In order to transmit a unit of information from one of the queues across the switching device, that unit of information is taken from the head (right hand end, as drawn) of a queue and passed, via a multiplexer 126, 128 to a crossbar switch 130 having (in this example) P inputs and P outputs, where P is an integer greater than one. Note that although a square crossbar switch 130, a non-square arrangement could be used instead.

Control of the multiplexers 126, 128 and the crossbar switch 130 is provided by control logic 140 comprising routing logic 142 and a virtual channel allocator 144, which together handle the overall routing of the virtual channels, and a switch allocator 146. The switch allocator 146 is shown in more detail in FIG. 5B.

Figure 5B:
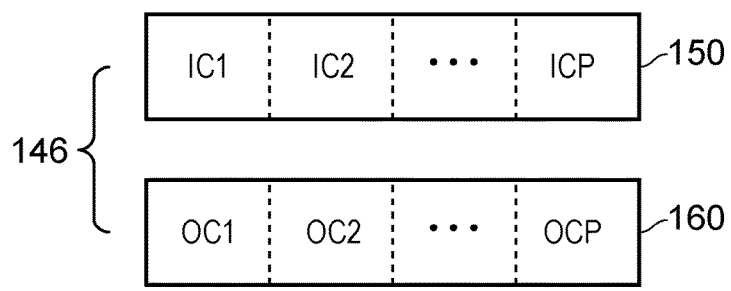
FIG. 5B schematically illustrates a switch allocator.

FIG. 5B schematically illustrates the switch allocator 146, which comprises a plurality of input circuit switch controllers 150 numbered as IC1 . . . ICP, where P (as mentioned above) is the number of inputs to the crossbar switch 130, and a plurality of output circuit switch controllers 160 numbered as OC1 . . . 00P (in the example of a P×P switch).

Comparing FIGS. 3 and 4 with the more detailed representations of FIGS. 5A and 5B, the queues 118, 124 correspond to the queues 40, 50. The request circuitry 60 is implemented as the input circuit switch controllers 150. The transmission circuitry 70 is implemented as the multiplexers 126, 128 and the crossbar switch 130. The selection circuitry 90 is implemented as the output circuit switch controllers 160 and the reception circuitry 100 is implemented as the outputs 132 of the crossbar switch 130.

In terms of the discussion which follows, queue handling at the input circuits is provided by the switch allocator 146 interacting with the multiplexers 126, 128 and the virtual queues 118, 124. The interactions which occur between output circuits and input circuits, and the decisions such as selection and arbitration decisions taken locally at an input circuit or an output circuit are carried out primarily by the input circuit switch controllers 150 and the output circuit switch controllers 160.

Figure 6:
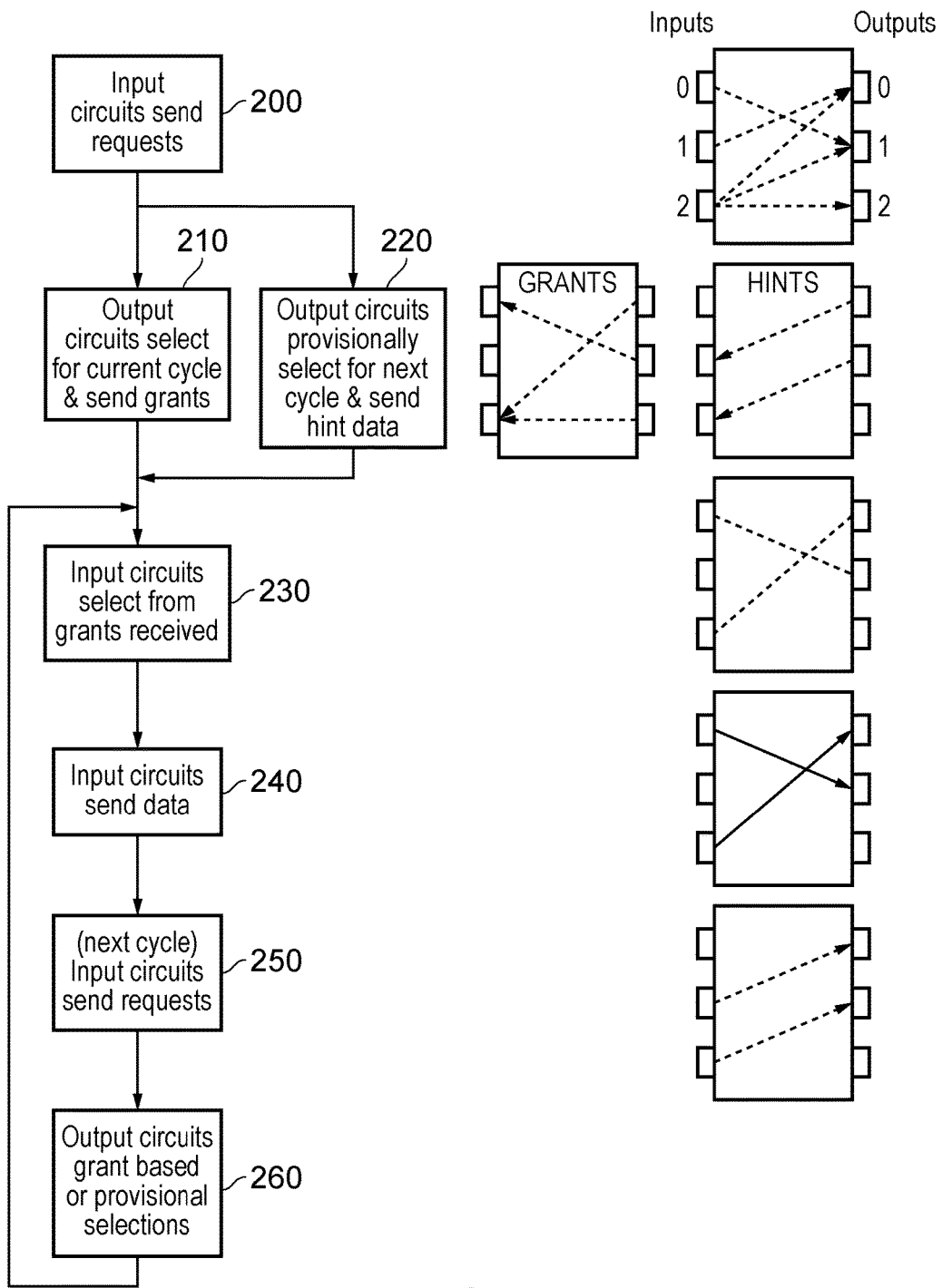
FIG. 6 is a schematic flow chart illustrating operations of an information switch.

FIG. 6 provides a schematic flow chart illustrating operations of an information switch of the type being described. To the left side of FIG. 6, flow chart steps are illustrated in an ordered sequence, and to the right of FIG. 6, horizontally aligned with respective flow chart steps, schematic representations of an information switch are provided to assist in the explanation. The information switch used in this example has three input ports, numbered as 0, 1, 2 and three output ports again numbered as 0, 1, 2. The numbering is shown on the upper most representation of the information switch in FIG. 6 and the same numbering is used throughout, although for clarity of the diagram it is not repeated at each representation. It will be appreciated that a three-input, three-output switch is used merely as an example for the purposes of assisting in explanation, and that different numbers of input and/or output ports or circuits could be used in other examples.

The process operates according to transmission cycles, for example defined by the signal 13. In a transmission cycle (for example, a clock cycle of a clock signal relating to at least the information switch 10) arbitration of transmission destinations takes place and, if appropriate, one or more information units such as flits are transmitted. That is to say, in a single transmission cycle the arbitration and transmission processes are carried out. In other examples, a pipelined approach could be used in which, for example, arbitration is always carried out and completed one transmission cycle ahead of actual transmission, and the same principles of operation could apply.

At a first step 200, and assuming that no so-called hint data has been received (hint data will be discussed in more detail below) the input circuits send requests for information transmission to output circuits. The requests are made according to packets or flits of information which are present in the input queues associated with the input circuits, for example those present at the heads or fronts (which is to say, the next-to-be-handled position) of the respective queues. In the example shown, the input circuit 0 has a flit at the head of the queue with a destination of output 1, input 1 has a flit with a destination of output 0, and input 2 has three flits in respective virtual queues with destinations of outputs 0, 1 and 2. A request is sent in respect of each flit and its respective destination, except in the case that a single input circuit (having multiple virtual queues) has two or more flits at the head of respective queues having the same destination. In this instance, the input circuit may use an internal selection mechanism (such as a detection of a transmission priority associated with the flits, or a round robin selection, or a pseudo random selection) to choose a flit from the multiple virtual queues having the same destination for which a request should be sent.

The output circuits receive all of these requests.

At a step 210, the output circuits each select one of the requesting inputs for information transmission in the current transmission cycle and send a so-called grant indication to those respective input circuits. This is shown schematically in the left-most of the two representations in which output 0 sends a grant indication to input 2, output 1 sends a grant indication to input 0 and output 2 send a grant indication to input 2. Note that the sending of a grant indication by an output circuit does not guarantee that the relevant input circuit will definitely send a flit to that output circuit, because (for example) the input circuit could receive grant indications from multiple output circuits. But it does guarantee that the output circuit will not receive a flit from any other input circuit in respect of that transmission cycle. An input circuit may not send a flit to an output circuit which has not indicated a grant in respect of that transmission cycle.

Also, at the step 220, which can take place at the same time as the step 210, the output circuits provisionally select one of the requesting input circuits for information transmission in the next transmission cycle and send so-called hint data to inform those input circuits that they have been provisionally selected. The hint data produced in the works example of FIG. 6 is provided by output 0 to input 1 and by output 1 to input 2.

The provisional selection can operate in various ways. For example, if the selection by an output circuit is made according to an algorithm such as a round robin algorithm, the output circuit can provisionally select an input circuit as the one, out of those input circuits currently making a request, which would next be selected according to the selection algorithm. In other examples, the output circuit could make a random selection of one of the currently-not-selected requesting input circuits, in which case it can improve the efficiency of the process if the output circuit retains a record of the provisional selection made in this way. In other examples, if (for example) two requests are received by an output circuit, the output circuit could send a grant indication to one requesting input circuit and provisionally select the other requesting input circuit. Again, it can improve the efficiency of the process if the output circuit retains a record of the provisional selection made in this way.

The provisional selection is not a guarantee or a requirement that transmission will take place from the provisionally selected input circuit to that output circuit at the next transmission cycle. But providing the provisional selection can improve the arbitration efficiency.

At a step 230, the input circuits select transmission routes according to the grant indications they have received. If an input circuit (which made one or more requests) receives no grant indications, that input circuit waits until the next transmission cycle and tries again; it does not send any information in the current transmission cycle. If an input circuit receives only one grant indication, it will select that output circuit for information transmission. If however an input circuit receives more than one grant, the input circuit applies a selection algorithm, which will be discussed below, to choose one of the grants. In the worked example, input 0 selects output 1 and input 2 selects output 0. Input 1 was not given a grant indication and so does not select an output circuit in this transmission cycle.

At a step 240, the input circuits send data according to their respective selected transmission routes. In the worked example, input 0 sends information to output 1 and input 2 sends information to output 0. Input 1 was not given a grant indication and so does not send any information in this transmission cycle.

At a step 250, at a next transmission cycle the input circuits send requests again, but in this instance the requests are according to the received hint data where that is present. Then, at a step 260, the output circuits issue grants according to the provisional selections represented by the hints data. Control then passes back to the step 230.

In example embodiments, where an input circuit has received hint data at a previous (such as an immediately preceding) transmission cycle providing a provisional selection of that input circuit, the input circuit may (for example) send a transmission request only to the output circuit which has provided the provisional selection or, in the case that two or more output circuits provisionally selected that input circuit, one of those output circuits chosen according to a selection algorithm at the input circuit. However, an input circuit is not compelled to send a request to an output circuit which provisionally selected that input circuit (even if only one output circuit did so); for example, the input circuit may have a higher priority flit at the head of a queue which has a different destination. An input circuit is not compelled to send only one request in the case of its provisional selection.

The hint data indicating a provisional selection can, in some examples, be sent by an output circuit only to the provisionally selected input circuit itself. In this example, the mere reception of hint data from an output circuit indicates to that input circuit that it has been provisionally selected by that output circuit. This means that the hint data can in principle be a very simple data item, because the way in which the hint data is routed contributes to the indication which is being passed by that hint data. In other examples, an output circuit can send the hint data (indicating provisional selection of a single input circuit) to more than one input circuit, for example as a broadcast message to all input circuits. In these examples, the hint data may need to convey, as part of the data itself, the identity of the provisionally selected input circuit. But an advantage is that other (not provisionally selected) input circuits can respond to such broadcast hint data by preferentially choosing other output circuits to send requests to. Any of these options provides an example of each output circuit being configured to communicate hint data provided by that output circuit to the one or more input circuits having a provisional selection indicated by that hint data.

In general terms, in an example arrangement an individual output circuit might alternate between (i) issuing grants and hints and (ii) issuing just grants, in that a hint might be issued in every alternate transmission cycle and then put into effect (as a grant) in the next alternate transmission cycle. Indeed, this can tend to be a natural result of an arrangement in which an input circuit, which has received hint data, sends a request only to a single output circuit which provided that hint data (because then it is less likely that in the transmission cycle following the issue of hint data, further contention will occur leading to the generation of further hint data). However, in other examples, hints could be issued whenever they are available. In the context of FIG. 6, where a hint is available, the example control flow might follow the loop of the steps 230 to 260. Where a hint is not available, the control flow might follow the loop of the steps 200 to 240.

According to the description above, as applied to the information switch 10, each input circuit is configured, in dependence upon a queue of one or more information units for transmission via that input circuit and in dependence upon hint data received in respect of a current transmission cycle, to send an information unit transmission request to one or more of the output circuits. Each output circuit is configured, in response to one or more information unit transmission requests received from respective input circuits, to select an input circuit for information unit transmission to that output circuit in a current transmission cycle and to provide hint data indicating a provisional selection, by that output circuit, of an input circuit at a next transmission cycle.

FIG. 6 therefore provides an example of an information switching method comprising:

communicating information units between a plurality of input circuits and a plurality of output circuits in successive transmission cycles (for example, at the step 240);

each input circuit sending an information unit transmission request to one or more of the output circuits in dependence upon a queue of one or more information units for transmission via that input circuit and in dependence upon hint data received in respect of a current transmission cycle (for example, at the steps 200, 250); and each output circuit selecting an input circuit for information unit transmission to that output circuit in a current transmission cycle and providing hint data indicating a provisional selection, by that output circuit, of an input circuit at a next transmission cycle, in response to one or more information unit transmission requests received from respective input circuits (for example at the steps 210, 220, 260).

Figure 7:
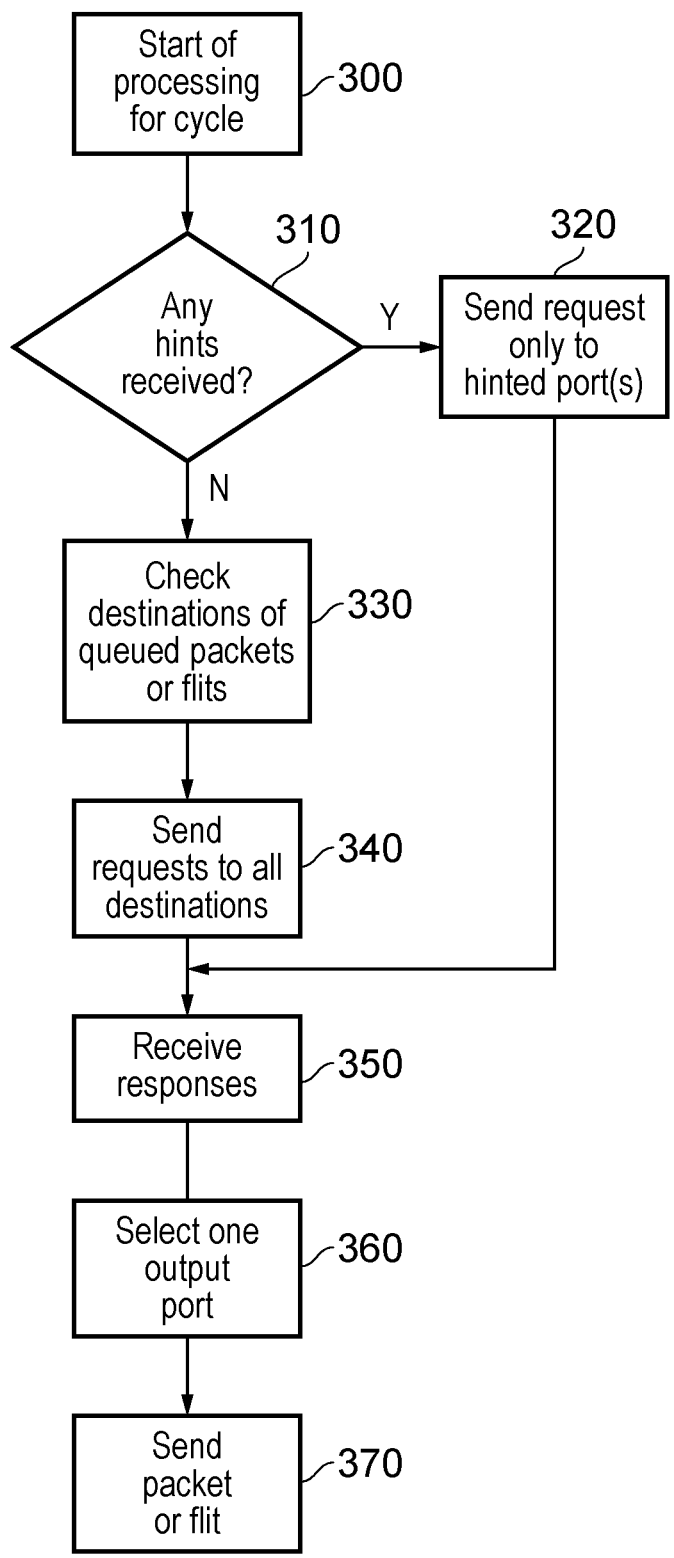
FIG. 7 is a schematic flowchart illustrating example operations applicable to an input circuit.

FIG. 7 schematically illustrates example operations applicable to an input circuit. A transmission cycle is started to be processed at a step 300. At a step 310, the input circuit detects whether any hints (provisional selections) applicable to the current transmission cycle were received in the previous transmission cycle.

If the answer is yes, then at a step 320 the input circuit sends requests only to the one or more output ports for which a hint was provided (though note that as discussed above this is just an example of various actions which are possible at this stage). This provides an example of each input circuit being configured, when hint data has been provided indicating a provisional selection of that input circuit by one output circuit, to request information unit transmission only to the output circuit which provided the hint data.

Control then passes to a step 350 to be discussed below.

If, at the step 310, the answer is that no relevant hints have been received, then at a step 330 the input circuit checks or ascertains the destination of queued information packets or flits. Subject to any conflicts, which will be discussed below, at a step 340 the input circuit sends information transmission requests to all output circuits representing destinations of the queued packets or flits (that is to say, the packets or flits at the head of their respective queues). This provides an example of each input circuit having two or more associated queues; and each input circuit being configured, in the absence of hint data indicating a provisional selection of that input circuit, to request information unit transmission to those output circuits which are destinations of information units at the head of at least one of the queues associated with that input circuit.

At a step 350, the input circuit receives responses from the output circuits indicating grant of zero or more output circuits and possibly one or more hints. Based on the grants, the input circuit selects one output circuit at a step 360 and, at a step 370 sends a packet of flit to the selected output circuit. This provides an example of each input circuit being configured to transmit an information unit, in a current transmission cycle, to an output circuit which selected that input circuit for information unit transmission.

Figure 8:
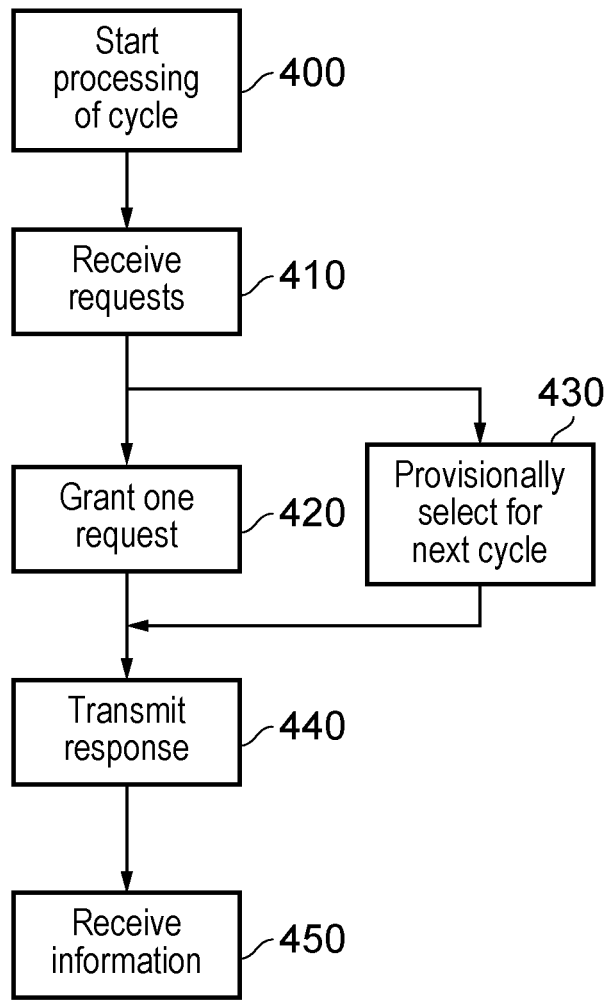
FIG. 8 is a schematic flow chart illustrating operations applicable to an output circuit.

FIG. 8 is a schematic flow chart illustrating operations applicable to an output circuit. A transmission cycle is processed starting from a step 400. At a step 410, the output circuit receives one or more requests from input circuits for information transmission to that output circuit.

At concurrent steps 420, 430, the output circuit grants one request in respect of the current transmission cycle and may provisionally select an input circuit for the next transmission cycle. This provides an example of each output circuit being configured to select an input circuit for information unit transmission in respect of a current transmission cycle from amongst those input circuits requesting information unit transmission, according to a circuit selection algorithm, for example a round robin algorithm. It also provides an example of each output circuit being configured to provide hint data in response to that output circuit receiving information unit transmission requests from more than one input circuit.

At a step 440, the output circuit transmits response information including grant and hint data forming an indication of the provisional selection. Subsequently, when the input circuits have made their selection as to which output circuits to use of those for which grants were provided, the output circuit receives through transmitted information at a step 450.

Figure 9:
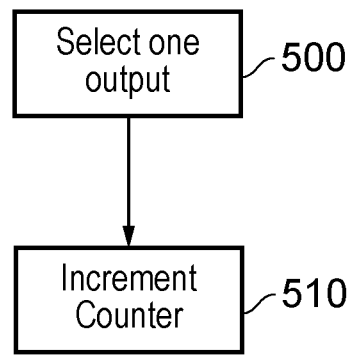
FIG. 9 is a schematic flowchart illustrating operations of an input circuit.

FIG. 9 is a schematic flowchart illustrating a technique by which each input circuit operates, when hint data has been provided indicating a provisional selection of that input circuit by two or more output circuits, to select one of those output circuits according to a hint selection algorithm in order that it may then request information unit transmission only to the selected output circuit. The particular example here is that the hint selection algorithm is a round robin algorithm, but it will be appreciated that other selection algorithms (including, as a possibility, a random or pseudo-random selection) could be used instead.

At a step 500, the input circuit selects one of the output circuits which has provided hint data indicating a provisional selection, according to the state of a counter (for example a counter provided or maintained by that input circuit).

For example, the input circuit may associate an index with each output circuit, for example a number from 1 to P (where P is the number of output circuits). (In other examples, a functionally equivalent numbering from, say, 0 to P−1 could be used). Amongst those output circuits providing hint data, the input circuit selects one according to a current state of a counter, for example a modulus-P counter which counts from 1 to P, then returns to 1 and counts to P again, and so on. For example, that one of the output circuits having an index equal to or next-higher than the current counter value may be selected.

Then, at a step 510, the counter is incremented. This could be an increment by 1 or it could be a change to "the index of the just-selected output circuit, plus one", for example, so as to give a different output circuit a greater chance of selection at a next stage.

The same technique, represented by the same steps, can be used by the input circuit to arbitrate or decide between multiple output circuits sending grant indications in respect of the current transmission cycle. Indeed, a common counter can be used in example embodiments, for both the questions of "which of two or more grant indications is accepted for the current transmission cycle" and "which of two or more hint indications is used as the basis for where to send a transmission request".

The hint selection algorithm can be dependent upon transmission priority information associated with information units in the associated queues, so, for example, if a particular flit has a high associated priority, which is higher than the priority associated with other competing flits, the input circuit could be arranged to select a transmission path required by that flit irrespective of the state of the counter.

Figure 10:
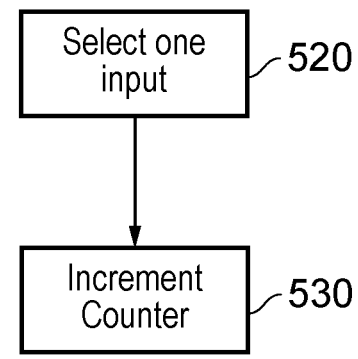
FIG. 10 is a schematic flowchart illustrating operations of an output circuit.

FIG. 10 schematically illustrates, as a schematic flowchart, a similar arrangement for use by the output circuits to select an input circuit from amongst a set of two or more competing input circuits each requesting information unit transmission. This technique can be used to select an input circuit to be provided with a grant indication in respect of the current transmission cycle, and/or an input circuit to be provisionally selected in respect of the next transmission cycle.

In general, the technique operates in a similar manner to that described in respect of FIG. 9. From the point of view of the output circuit, each input circuit may be assigned an index, for example from 1 to P (where P is the number of input circuits) and amongst those input circuits requesting data transmission, the output circuit selects one according to a current state of a counter, for example a modulus-P counter which counts from 1 to P, then returns to 1 and counts to P again, and so on. For example, that one of the requesting input circuits having an index equal to or next-higher than the current counter value may be selected.

The same algorithm can be used to select an input circuit to be provided with hint data indicating a provisional selection in respect of the next transmission cycle. There are various ways in which this can be achieved. For example:
  i. the output circuit selects a grant at the step 520 according to a current state of the counter;
  ii. the output circuit increments the counter at a step 530 (where the term "increment" has a similar range of meanings to those just described); and
  iii. the output circuit repeats the step 520 according to the newly-changed counter value to generate the provisional selection at the next transmission cycle.

In an alternative arrangement, the process could run as follows:
  i. the output circuit selects a grant at the step 520 according to a current state of the counter;
  ii. the output circuit repeats the step 520 according to a notional counter value, as though the counter value has been incremented, to generate the provisional selection at the next transmission cycle; and
  iii. the output circuit increments the counter at a step 530 (where the term "increment" has a similar range of meanings to those just described).

In these examples, each output circuit is configured to generate the hint data according to the circuit selection algorithm as applied to those input circuits requesting information unit transmission.

In example embodiments, the process to provisionally select an input circuit for the next transmission cycle, in which hint data is generated, specifically excludes the input circuit which has been given a grant in respect of the current transmission cycle. In this way, in example embodiments, each output circuit is configured to generate the hint data according to the circuit selection algorithm as applied to one or more input circuits request information unit transmission other than an input circuit selected in respect of the current transmission cycle.

Figure 11:
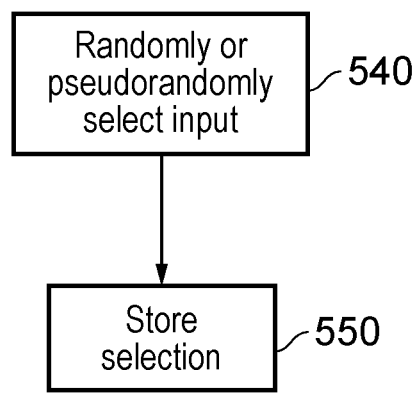
FIG. 11 is a schematic flowchart illustrating operations of an output circuit.

FIG. 11 schematically illustrates another example of a technique for use by each output circuit, which can in some cases provide a faster or simpler selection algorithm. Of those input circuits making a request for information transmission (optionally excluding the input circuit for which a grant has been generated in respect of the current transmission cycle) the output circuit randomly or pseudo-randomly selects (at a step 540) one as a provisional selection in respect of the next transmission cycle, and sends hint data indicating that provisional selection. But in this instance, the random or pseudo-random nature of the selection may mean in some instances that the output circuit cannot be sure to repeat the same selection at the next transmission cycle, so at a step 550 the provisional selection is stored (for example in a memory or register associated with the output circuit) for potential use as a selection for grant at the next transmission cycle. In this way, each output circuit is configured to provisionally select an input circuit for information unit transmission in respect of a next transmission cycle from amongst those input circuits requesting information unit transmission, according to a random or pseudo-random selection. In example embodiments, each output circuit comprises data storage configured to store (at the step 550) the provisional selection of an input circuit in respect of a next transmission cycle.

In a specific example, if there are only two input circuits currently requesting transmission, to an output circuit, that output circuit is configured to select one of the two input circuits for information unit transmission in a current transmission cycle and to provide hint data in respect of the other one of the two input circuits. This would in fact occur intrinsically as part of the arrangements of FIG. 10 and FIG. 11, in the case that only two requests are received and assuming that (as discussed as optional embodiments) the granted input circuit is excluded from the process to provisionally select an input circuit for the next transmission cycle). Further examples of such a technique are also discussed below in connection with FIG. 13.

Figure 12:
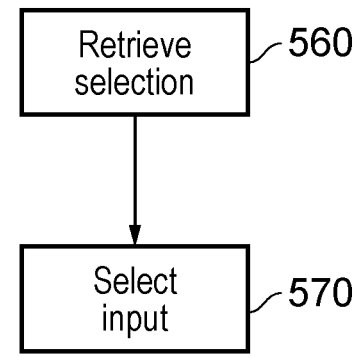
FIG. 12 schematically illustrates an example technique making use of stored hint or similar data.

An example technique making use of hint or similar data stored at the step 550 is shown in FIG. 12. Here, at a step 560 the output circuit retrieves data indicating a previously-made provisional selection stored at an instance of the step 550. At a step 570, the output circuit selects a currently requesting input circuit. For example, if there are one or more currently requesting input circuits and those one or more input circuits include the provisionally selected input circuit retrieved at the step 560, then in example embodiments the output circuit can be configured to select that particular input circuit for grant.

Figure 13:
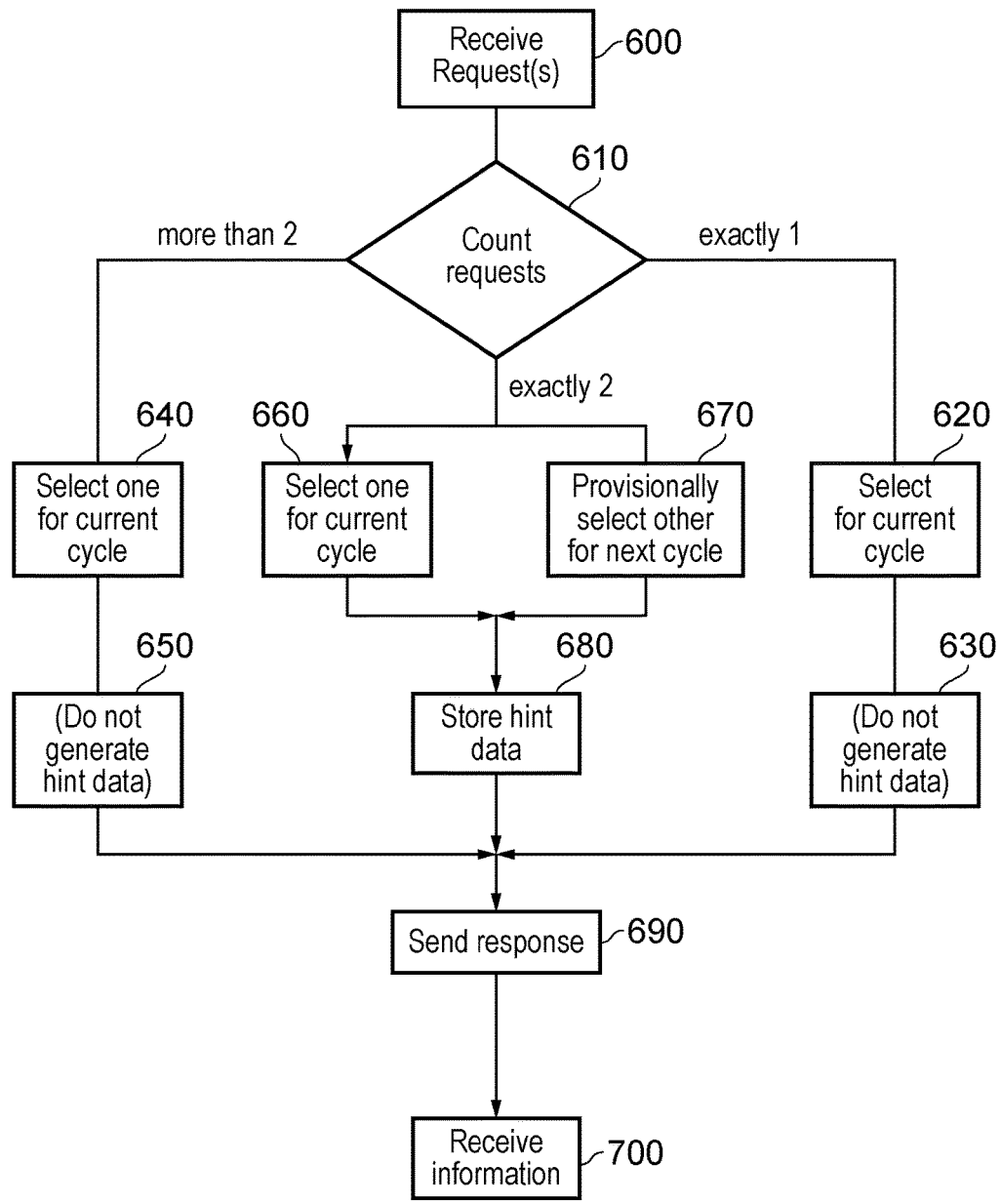
FIG. 13 is a schematic flow chart representing an example alternative technique for generating provisional selections and hint data at an output circuit.

FIG. 13 is a schematic flow chart representing an example alternative technique for generating provisional selections and hint data at an output circuit. This technique recognises that in a real system it can in fact be quite unusual to receive more than two simultaneous requests from competing input circuits, and so an elegantly straightforward technique for generating the provisional selection can be used at the output circuits.

An output circuit receives one or more requests from one or more input circuits at a step 600.

At a step 610, the output circuit counts or detects the number of requests received, or at least detects whether the number of requests falls into three categories: exactly one request, exactly two requests, or more than two requests.

In the case of exactly one request, control passes to a step 620 at which the input circuit which made the one request is selected in respect of the current transmission cycle. A notional step 630 is provided purely for explanation purposes to illustrate the fact that hint data representing a provisional selection for a next transmission cycle is not generated. Control passes to a step 690 to be discussed below.

Returning to the step 610, if it is detected that there are more than two requests then, at a step 640, one of the requests is selected in respect of the current transmission cycle, for example using a selection algorithm or by a random or pseudo random selection as discussed above. Again, a notional step 650 is shown purely for explanation purposes to illustrate the fact that a provisional selection for the next transmission cycle is not made, and control again passes to the step 690.

Returning to the step 610, if there are exactly two requests then control passes to the simultaneously executed steps 660, 670. At the step 660, one of the two requests is selected as a grant in respect of the current transmission cycle. This selection may be one a random or a pseudo random basis or using a selection algorithm. At the step 670, the other of the two requests is provisionally selected for the next transmission cycle. Hint data is generated in respect of that provisionally selected request and the hint data is stored at a step 680. Control passes to the step 690.

By basing the provisional selection on the other request (that is to say, the non-selected request for the current transmission cycle), this avoids the need to execute any sort of arbitration algorithm in respect of the step 670. It is a simple selection of that request which was not selected by the step 660.

At the step 690, a response is sent to one or more of the input circuits, formed of a grant indication which is sent at least to the input circuit for which its request has been granted, and a hint indication which is sent at least to the input circuit provisionally selected by the hint data. Then, at a step 700, the output circuit receives information sent by the input circuit subject to the grant indication.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. An information switch comprising:
a plurality of input circuits and a plurality of output circuits, the information switch being configured to communicate information units between the input circuits and the output circuits in successive transmission cycles;
each input circuit being configured, in dependence upon a queue of one or more information units for transmission via that input circuit and in dependence upon hint data received in respect of a current transmission cycle, to send an information unit transmission request to one or more of the output circuits; and
each output circuit being configured, in response to one or more information unit transmission requests received from respective input circuits, to select an input circuit for information unit transmission to that output circuit in a current transmission cycle and to provide hint data indicating a provisional selection, by that output circuit, of an input circuit at a next transmission cycle;
wherein each output circuit is configured to select an input circuit for information unit transmission in respect of a current transmission cycle from among those input circuits requesting information unit transmission, according to a circuit selection algorithm; and
wherein each output circuit is configured to generate the hint data according to the circuit selection algorithm as applied to one or more input circuits requesting information unit transmission other than an input circuit selected in respect of the current transmission cycle.

2. The information switch according to claim 1, in which each input circuit is configured to transmit an information unit, in a current transmission cycle, to an output circuit which selected that input circuit for information unit transmission.

3. The information switch according to claim 1, in which each input circuit is configured, when hint data has been provided indicating a provisional selection of that input circuit by one output circuit, to request information unit transmission only to the output circuit which provided the hint data.

4. The information switch according to claim 1, in which:
each input circuit has two or more associated queues; and
each input circuit is configured, in the absence of hint data indicating a provisional selection of that input circuit, to request information unit transmission to those output circuits which are destinations of information units at the head of at least one of the queues associated with that input circuit.

5. The information switch according to claim 1, in which the circuit selection algorithm is a round robin algorithm.

6. The information switch according to claim 1, in which each output circuit is configured to provisionally select an input circuit for information unit transmission in respect of a next transmission cycle from amongst those input circuits requesting information unit transmission, according to a random or pseudo-random selection.

7. The information switch according to claim 1, in which each output circuit comprises data storage configured to store the provisional selection of an input circuit in respect of a next transmission cycle.

8. The information switch according to claim 1, in which each output circuit is configured to communicate hint data provided by that output circuit to the one or more input circuits having a provisional selection indicated by that hint data.

9. An information network comprising:
a plurality of information handling nodes; and
an information switch according to claim 1, the information switch being configured to carry information between the information handling nodes.

10. A network-on-chip device comprising an integrated circuit substrate on which is fabricated an information network according to claim 9.

11. An information switching method comprising:
communicating information units between a plurality of input circuits and a plurality of output circuits in successive transmission cycles;
each input circuit sending an information unit transmission request to one or more of the output circuits in dependence upon a queue of one or more information units for transmission via that input circuit and in dependence upon hint data received in respect of a current transmission cycle;
each output circuit selecting an input circuit for information unit transmission to that output circuit in a current transmission cycle; and
each output circuit providing hint data indicating a provisional selection, by that output circuit, of an input circuit at a next transmission cycle, in response to one or more information unit transmission requests received from respective input circuits, wherein the selecting step comprises selecting an input circuit for information unit transmission in respect of a current transmission cycle from amongst those input circuits requesting information unit transmission, according to a circuit selection algorithm; and wherein the providing step comprises generating the hint data according to the circuit selection algorithm as applied to one or more input circuits requesting information unit transmission other than an input circuit selected in respect of the current transmission cycle.

12. An information switch comprising:

a plurality of input circuits and a plurality of output circuits, the information switch being configured to communicate information units between the input circuits and the output circuits in successive transmission cycles;

each input circuit being configured, in dependence upon a queue of one or more information units for transmission via that input circuit and in dependence upon hint data received in respect of a current transmission cycle, to send an information unit transmission request to one or more of the output circuits; and each output circuit being configured, in response to one or more information unit transmission requests received from respective input circuits, to select an input circuit for information unit transmission to that output circuit in a current transmission cycle and to provide hint data indicating a provisional selection, by that output circuit, of an input circuit at a next transmission cycle;

wherein each output circuit is configured to provide hint data in response to that output circuit receiving information unit transmission requests from more than one input circuit; and wherein, when two input circuits request information unit transmission to an output circuit, that output circuit is configured to select one of the two input circuits for information unit transmission in a current transmission cycle and to provide hint data in respect of the other one of the two input circuits.

13. An information switching method comprising:

communicating information units between a plurality of input circuits and a plurality of output circuits in successive transmission cycles;

each input circuit sending an information unit transmission request to one or more of the output circuits in dependence upon a queue of one or more information units for transmission via that input circuit and in dependence upon hint data received in respect of a current transmission cycle;

each output circuit selecting an input circuit for information unit transmission to that output circuit in a current transmission cycle; and each output circuit providing hint data indicating a provisional selection, by that output circuit, of an input circuit at a next transmission cycle, in response to one or more information unit transmission requests received from respective input circuits, wherein the providing step comprises providing the hint data in response to that output circuit receiving information unit transmission requests from more than one input circuit; and wherein, when two input circuits request information unit transmission to an output circuit, the selecting step comprises that output circuit selecting one of the two input circuits for information unit transmission in a current transmission cycle and to provide hint data in respect of the other one of the two input circuits.

\* \* \* \* \*